April 15, 1947.  W. H. SMITH  2,419,173
TORPEDO CONTROL
Filed July 28, 1943  3 Sheets-Sheet 1

WITNESSES:
Wm. B. Sellers.

INVENTOR
Walter H. Smith.
BY
Paul C. Friedemann
ATTORNEY

April 15, 1947. W. H. SMITH 2,419,173
TORPEDO CONTROL
Filed July 28, 1943 3 Sheets-Sheet 3
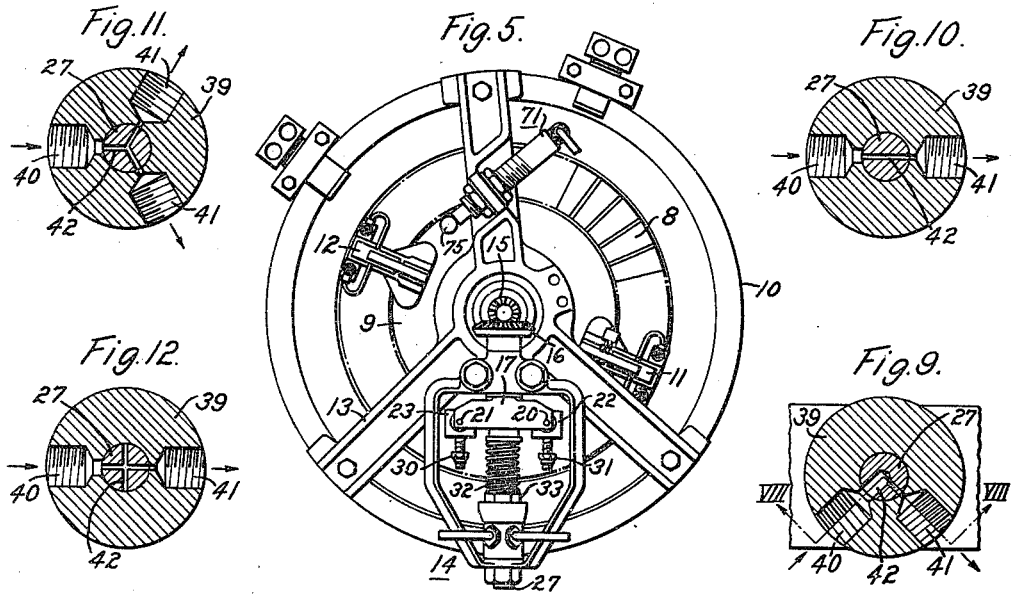
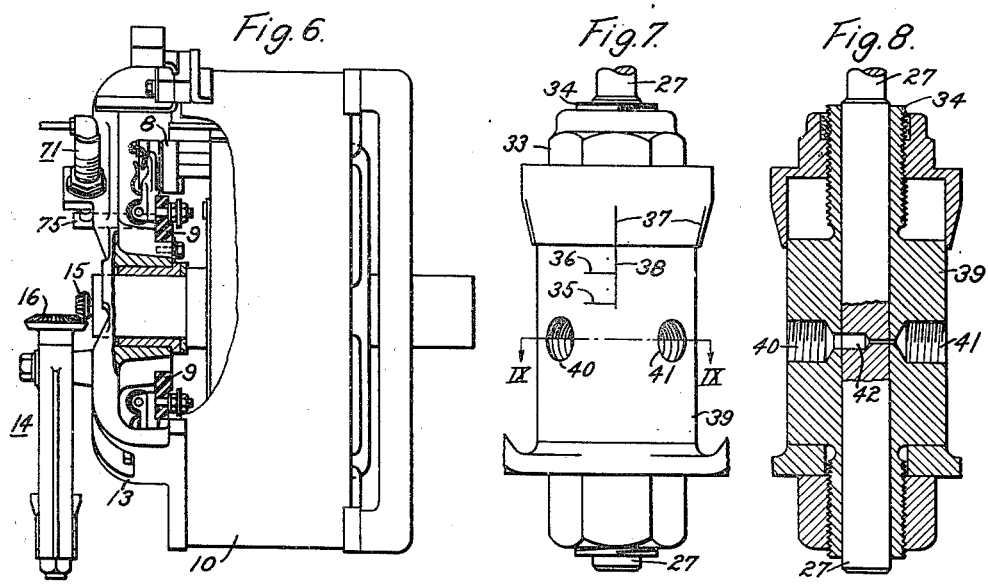
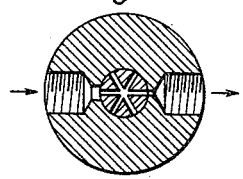
INVENTOR
Walter H. Smith.
BY
Paul E. Friedemann
ATTORNEY Patented Apr. 15, 1947

2,419,173

UNITED STATES PATENT OFFICE 2,419,173

TORPEDO CONTROL

Walter H. Smith, Wilkinsburg, Pa., assignor to Westinghouse Electric Corporation, East Pittsburgh, Pa., a corporation of Pennsylvania Application July 28, 1943, Serial No. 496,415

13 Claims. (Cl. 114—20)

My invention relates to a system of control, and more particularly to a control for controlling the operation of a conveyance as, for example, a torpedo.

The prior art type of torpedoes are usually driven by a turbine operated from compressed air. As the pressure in the flasks decreases, the efficiency of the turbine is very materially decreased and also the speed drops off considerably so that the speed of the torpedo over its entire run varies from a high speed to a relatively low speed. Such speed variation of the torpedo very materially affects the firing accuracy and also effects the range over which any accurate shots might be made.

The present war brought into use the all-electric torpedoes. However, all-electric torpedoes may have the same disadvantage since it is well known that a storage battery, whether it be a primary battery or a secondary battery, very materially decreases its terminal voltage with the degree of discharge of the battery.

One broad object of my invention is the provision of maintaining the driving means for a torpedo at a constant speed till the battery is completely exhausted regardless of the variation in the terminal pressure or potential of the battery or other source of energy.

Another object of my invention is the provision of means for maintaining the speed of an electric propulsion motor of a torpedo constant over the entire run of the torpedo regardless of variations in voltage of the supply.

A more specific object of my invention is the provision of means for controlling the speed of a motor without any hunting of the control means.

The foregoing objects are merely illustrative of the object of my invention, and other objects and advantages will become readily apparent from a study of the following specification and the appended claims and the accompanying drawings, in which:

Fig. 5 is an end view of the propulsion motor,

Fig. 6 is a side view of the propulsion motor,

Fig. 7 is a side view of a detail of my invention;

Fig. 8 is a longitudinal sectional view, along line VIII—VIII of Fig. 9;

Fig. 9 is a transverse sectional view on line IX—IX of Fig. 7; and

Figs. 9, 10, 11, 12 and 13 are transverse sectional views of modified showings of certain valve structures embodied in my invention.

Figure 1:
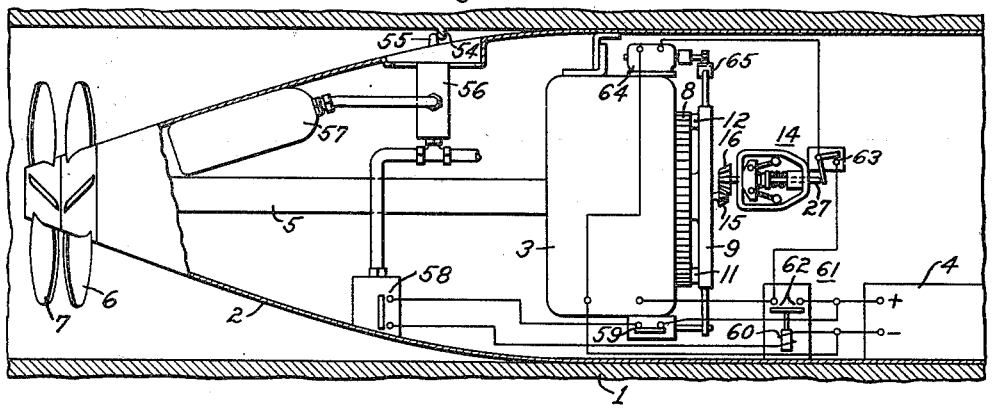
Figure 1 is a somewhat schematic showing of an electrically propelled torpedo provided with my invention.

Referring more particularly to Fig. 1 of the drawings, 1 designates a torpedo tube shown in section, with the torpedo 2 itself shown sectionalized longitudinally to illustrate the essential apparatus of my invention embodied in the torpedo. The showing is an all-electric torpedo propelled by the motor 3 from a battery 4. The motor, through shaft 5 and through suitable differential mechanisms that are no part of my invention and are not shown, operates the two propellers 6 and 7 in opposite directions for reasons well known in the art. The motor 3 is a series type motor and is provided, for the purpose of conserving space, with a radial commutator 8 and a brush shifting ring 9 for controlling the speed of the motor.

The use of a series motor for torpedo propulsion is a novel combination. In a torpedo, space is at a premium. With a series motor no starting control is needed, the commutating poles can be eliminated, the conductors are all heavier and stronger and thus not so readily subject to damage upon firing of the torpedo. The foregoing novel results, aiding in the reliability of the service and conserving space, are illustrative but not exhaustive of the advantages of the series motor for torpedo propulsion.

The brush shifting mechanism is better shown in Figs. 5 and 6 where 10 indicates the motor frame including the poles of the magnetic circuit, 8 designates the radial type commutator and 9 is a ring of insulating material (see Fig. 6), carrying the brushes as 11 and 12. For purposes of clarity in describing my invention, I show only two brushes but in the actual installation the machine has six poles. There may, however, be a considerable number of pairs of poles. All of the brushes are mounted to be rotated with the ring 9. Disposed at the end of the motor is the spider 13 which not only positions the ring 9 with reference to the motor shaft, but also has mounted thereon the governor mechanism generally designated by 14.

Figure 4:
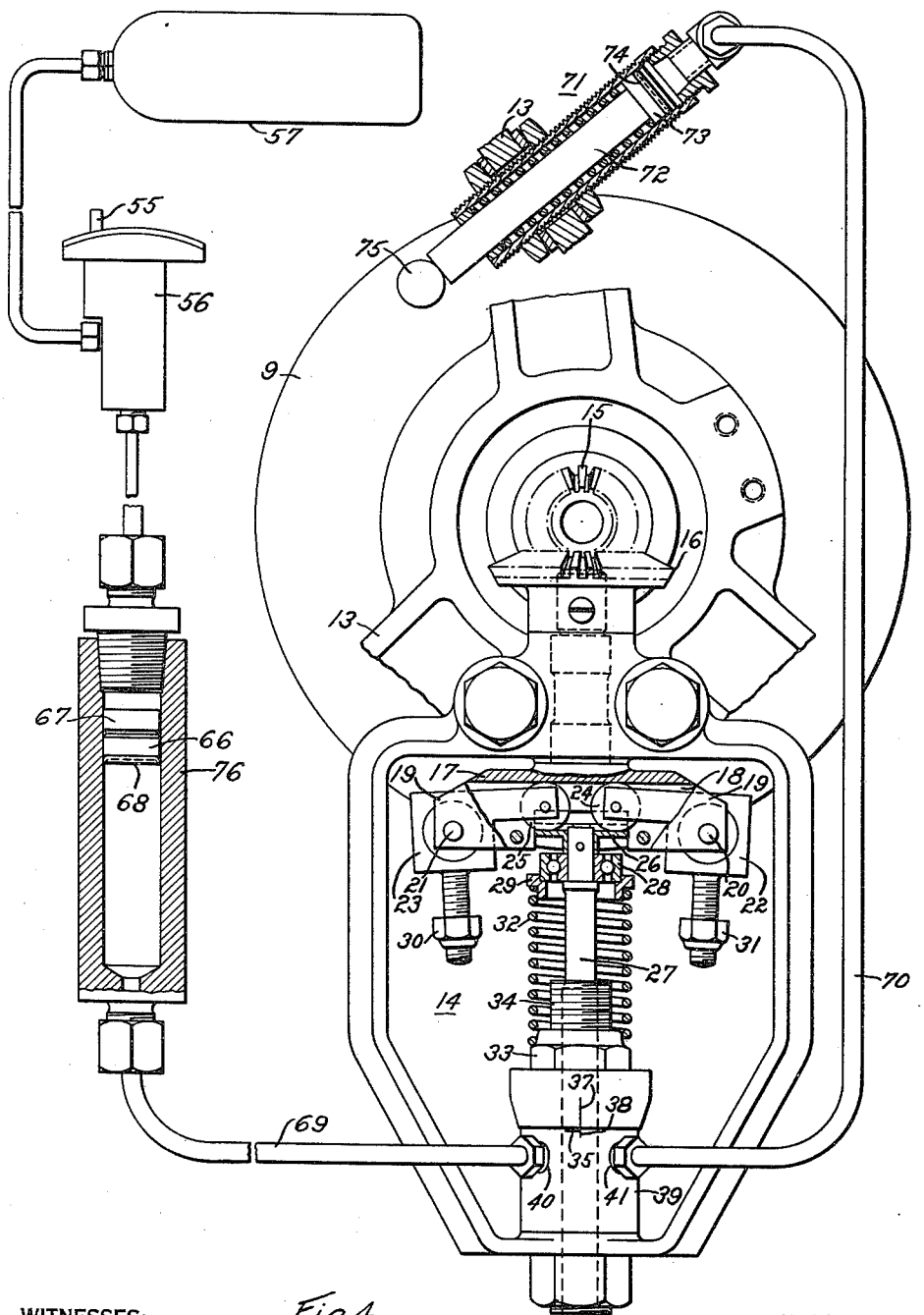
Fig. 4 is a modified showing of my invention.

The governor mechanism is one of the unique features of my invention and to suitably operate the governor mechanism the motor shaft is provided with bevel gear 15 operating the bevel gear 16, which, in turn, rotates the cross bar 17, provided with a longitudinal channel 18 and end enlargements 19. Pivoted at 20 and 21 on the enlargements 19 are bell crank levers 22 and 23. These bell crank levers are provided with disk-like rollers 24 and 25 which coact with a disk-like member 26 keyed to the shaft or valve stem 27. The disk-like member 26 is provided with a diametrical slot, as shown in Fig. 4, just wide enough to loosely receive the disk-like rollers 25. The disk-like member 26 engages the thrust bearing 28 of the ball bearing type, and thus provides for free rotation of the shaft 27 but no rotation is imparted to the outer race of the ball bearing 28 and thus no rotation whatsoever to the annular member 29.

The depending portions of the bell crank levers are each provided with threads as shown which carry nuts 30 and 31. These nuts are provided with threads of such nature as to be binding on the depending portion of the bell crank lever, and, therefore, are not caused to shift axially on the depending portion except when positively adjusted by means of a wrench. It will thus be apparent that the nuts 30 and 31 act as the fly poles of a governor whose effective moment arm may be adjusted by axially adjusting the nuts.

The annular member 29 is provided with a shoulder for receiving the compression spring 32. The degree of compression of this spring may be adjusted by turning the nut 33 on the threaded sleeve-like stem 34 of the bearing 39 for the shaft 27. By the adjusting nut 33 very fine speed adjustments may be obtained with my governor. Further, the adjustment can be carried out during motor operation. This is illustrated in Fig. 4 and to still better advantage in Fig. 7 where the graduation 35 may represent one speed, graduation 36 another speed, whereas intermediate speeds may be read off by the graduations 37 in coaction with the longitudinal index 38. For instance, graduation 35 may represent the speed of 900 R. P. M., 36 the speed of 1200 R. P. M., whereas the graduations 37 may, depending upon the position of the nut, indicate speeds intermediate the speeds of the main graduations.

The bearing 39 for shaft 27 is provided with an inlet opening 40 and an outlet opening 41 and coacting with these openings, respectively, I provide apertures in the shaft 27. In Figs. 4, 5, 7, 8 and 9, I show only one opening as 42 through the shaft 27. As will be apparent from an inspection of Figs. 8 and 9, one portion of the opening 42 is of a larger diameter than the other. However, this is not particularly significant except that in the process of manufacturing, it is more convenient to control the size of the aperture, namely, the small portion of it if the portion at right angles to it as shown in Fig 9 is relatively large.

From the foregoing description, it will be apparent that as the speed of the motor varies the shaft 27 rotates directly proportional to the motor speed and its axial position is also governed directly proportional to speed. From this it will be apparent that if fluid or a liquid, as oil under pressure, is supplied to the inlet opening 40, it will only emerge at the outlet opening 41 if the aperture 42 is in alignment with the inlet opening and outlet opening, and this can only occur at a predetermined speed. Furthermore, the quantity of liquid emitted at the outlet opening is dependent upon the axial position of the shaft 27 and thus upon the area of registry of the aperture 42 with the inlet and outlet openings. Furthermore, the slower the speed the longer will be the period of time for each revolution that the registry will be maintained. From this it will be apparent that a liquid supplied under pressure to the inlet opening 40 will be emitted in short spurts at the outlet opening 41 only when the speed of the motor has decreased to a given value and the length or the quantity of each emission will be a function of the amount of such decrease in speed. The value of this will appear more clearly hereinafter.

As shown in Fig. 9, only one registry may occur for each revolution. However, since some applications may require that a greater quantity of liquid be transmitted, it may be desirable to utilize apertures in the shaft 27 as shown in either Fig. 10, Fig. 11, Fig. 12 or Fig. 13. In Fig. 10, two spurts of liquid will be transmitted for each revolution, namely, each time that the shaft has rotated through only 180°. In Fig. 11 two outlet openings are shown and the apertures in the shaft 27 are displaced at 120° of each other, three discharges will thus occur for each revolution of the shaft 27. Fig. 12, where two perpendicularly intersecting apertures are shown, four discharges of liquid will take place at the outlet openings for each revolution of the shaft. In practice the outlet openings are combined into a single outlet tube. In Fig. 13, where three intersecting apertures are shown 60° apart, six discharges of liquid will take place at the outlet openings for each revolution of the shaft.

Figure 2:
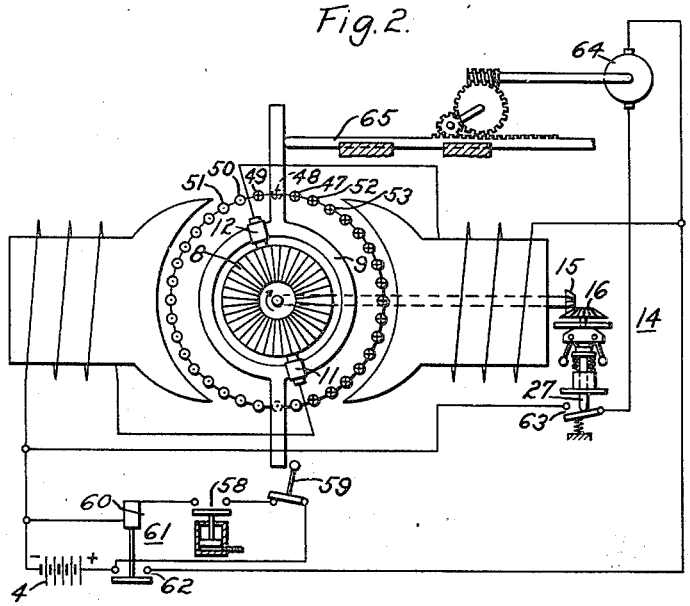
Fig. 2 is also a somewhat schematic showing of my invention illustrating the theory of operation of my system of control for maintaining constant motor speed.
Figure 3:
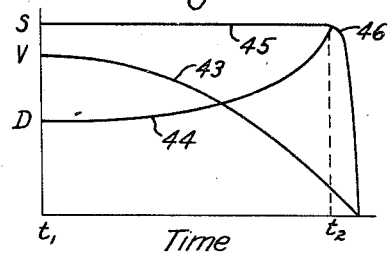
Fig. 3 shows a plurality of curves to facilitate the disclosure of my invention.

To gain a better understanding of my invention it may not be amiss to discuss the showing in Figs. 2 and 3, respectively. In Fig. 3, curve 43 indicates how the battery voltage varies with its degree of discharge and if the rate of discharge is known, the curve may be plotted against time, as shown in Fig. 3. Curve 44 shows how the demagnetizing component of the armature current of a series motor may be varied by shifting the brushes in such a direction as to increase the demagnetizing component. If the voltage, therefore, supplied to a series motor changes, as indicated by curve 43, and the demagnetizing component can be varied as shown by curve 44, then it is apparent that some optimum rate of change of brush position may be obtained so as to obtain a constant speed for the motor. Curve 45 indicates the speed variation of the type of motor I utilize with my system of control.

It will be noted that the speed remains constant from time $t_1$ to time $t_2$. The speed then drops off to zero. This simply means that at the region 46 the battery is very nearly completely exhausted and there is no possibility of extracting further sufficient energy from it to operate the motor. Normally, in torpedo operation it is desirable to at least obtain a constant speed for the torpedo for about 50 seconds or some other similar time period.

In Fig. 2, the brushes on the ring 9 are shown as disposed in the position that would normally be called the "neutral position." In this position, conductor turns 47, 48 and 49 produce some demagnetizing component but if during operation, means are provided for shifting the ring 9 in a counterclockwise direction to such a position as to make the additional conductor turns 50, 51, 52 and 53, demagnetizing turns, then it is apparent that the flux of the motor is decreased and its speed will thus be increased. It is not my aim, however, to rotate the ring 9 counterclockwise haphazardly over the entire range just mentioned, but to do so in small steps depending upon the tendency of the motor speed to drop. Further, in actual use many more turns are involved so that a finer speed control is obtained than would be possible if no more than conductors 47 to 53, inclusive, were involved.

To fully understand this, let it be assumed that the torpedo is in the position shown in Fig. 1 and is then fired by the usual methods used to fire torpedoes. In so doing, the dog 54 in the torpedo tube operates the lever 55 which actuates a valve or a trigger switch 56. As soon as this valve 56 is operated, the air under compression in the flask 57 is allowed to flow to a plurality of mechanisms on the torpedo to operate them but for my purpose it is sufficient to know that the air under pressure also actuates the pneumatic switch 58. This switch 58 may be operated directly by lever 55 and no air flask is needed.

As soon as this switch 58 is actuated, a circuit is established from the positive terminal of the battery through the limit switch 59, pneumatic switch 58, the actuating coil 60 of the electromagnetic switch 61 to the negative terminal of the battery. The electromagnetic switch 61 immediately operates closing the contact members 62, thereby establishing an energizing circuit for the series motor, as shown in Fig. 2, and this motor immediately comes up to speed and the governor mechanism immediately opens the contact members 63.

As the motor operates at the constant speed selected by the suitable adjustments made on the governor mechanism, namely, the adjustments of nuts 30, 31 and the adjustment of the compression of spring 32 by the nut 33 (see Fig. 4), contact members 63 remain open but as soon as the speed decreases by a slight amount from that selected, contact members 63 close and a circuit is then established from the positive treminal of the battery through the pilot motor 64, governor switch 63 to the negative terminal of the battery.

In actual practice, the governor switch is selected to be of the snap acting type to open and close with the least amount of axial change of position of shaft 27. This means that any small departure from the speed slected will cause operation of the pilot motor 64 to shift the rack 65 engaging the lever arm on the ring 9. The ring 9 is thus shifted counterclockwise, and since a small movement or shift of the brushes immediately effects the speed correction desired, the governor switch again opens and pilot motor 64 is stopped. In actual operation, the brush is at first shifted but very slowly by infrequent intermittent operation of the pilot motor 64 and as the battery becomes more and more discharged, the frequency and time periods of operation of motor 64 become larger and the brushes are thus shifted faster until the battery is substantially completely discharged and the voltage collapses to some low value and the speed decreases. The limit switch 59 is so positioned that the circuit for the battery is opened and no serious damage may thus be caused to the battery.

For the showing in Figs. 4 to 13, inclusive, a hydraulic speed control is used, and for this type of operation the governor does not actually operate a switch but operates the valve mechanisms hereinbefore discussed. When the hydraulic mechanism is used, firing of the torpedo mechanism causes the operation of the lever 55 and the valve 56, but in this instance the high pressure air in addition to operating the switch 58 is admitted to the upper portion of the reservoir 76.

This reservoir 76 is filled with a suitable oil (not shown) below the piston 66, which piston is held in its upper position by the liquid disposed below it. The piston is provided with suitable sealing ring 67 and a sealing cup 68 made of a synthetic rubber that is non-reactive with the oil used. When the air pressure is admitted to the reservoir, the piston 66 will tend to move to expel the oil from the reservoir but no liquid can be expelled from the reservoir except when the speed of the motor is below a predetermined value. When this occurs, liquid is transferred from the reservoir through tube 69 to the inlet opening 40 and from there to the outlet opening 41. As the liquid is emitted in spurts from the accurately machined opening, it moves through the conduit 70 to the hydraulic brush shifting mechanism 71.

This brush shifting mechanism 71 is adjustably mounted on the spider 13 and includes a plunger 72 for the piston head 73. This piston head 73 is provided with a suitable sealing cup 74 of synthetic rubber nonreactive with the oil so that no liquid can leak past the piston. The plunger 72 engages a pin 75 on the ring 9, and as the speed varies, the plunger 72 moves the ring 9 counter-clockwise to shift the brushes. It will thus be apparent that the greater the tendency of the speed change, the faster will plunger 72 move. The fundamental action, therefore, of plunger 72 is substantially the same as the rack 65 shown in Fig. 2. In one case, a pilot motor operates the ring 9, whereas in the second case a hydraulic mechanism operates the ring 9, but the change effected on the ring 9 is alike in each case.

One of the unique features, however, of my hydraulic system is, there is no possibility of any hunting of the governing mechanism. One of the main reasons no hunting can take place is that the liquid is emitted in short spurts and there is thus no opportunity whatsoever of developing any inertia of motion in the parts, and in consequence the ring 9 carrying the brushes will hold exactly the position it is called upon to hold by the governing mechanism.

While I have disclosed two embodiments of my invention, namely, one species of an electric type and another of a hydraulic type, I do not wish to be limited to the particular combinations shown, but wish to be limited only by the scope of the claims hereto appended.

I claim as my invention:

1. A system of control for an electrically propelled conveyance, in combination, an electric battery providing a source of direct current, a direct current propulsion motor connected to the battery for propelling the conveyance, said motor having exciting poles and windings thereon connected to the battery, and control means operable as a function of the motor speed and the battery voltage for progressively decreasing the effective excitation of the field winding just sufficiently to compensate for the decrease in battery voltage with the degree of discharge of the battery to thus maintain the motor speed constant up to near complete exhaustion of the battery.

2. In a system of control for an electrically propelled conveyance, in combination, an electric battery providing a source of direct current, a direct current propulsion motor of the series type connected to the battery for propelling the conveyance, said motor having exciting poles and windings thereon connected to the battery, and control means operable as a function of the motor speed and the battery voltage for progressively shifting the motor brushes to produce a demagnetizing component by the motor armature current for decreasing the effective excitation of the field winding just sufficiently to compensate for the decrease in battery voltage with the degree of discharge of the battery to thus maintain the motor speed constant up to near complete exhaustion of the battery.

3. In a system of control for an electrically propelled conveyance, in combination, a conveyance, a battery of a given capactiy, a direct-current motor of the series type connected to the battery and coupled to propel said conveyance, said motor being provided with a commutator and brushes mounted on a rotatable ring for shifting the brushes circumferentially of the brushes from one position to another position, and means responsive to the motor speed for progressively shifting said ring and thus the brushes circumferentially of the commutator from the one position to the second position to thus progressively increase the demagnetizing component of the armature current whereby the motor speed is maintained constant up to near complete discharge of the battery.

4. In a system of control for an electrically propelled conveyance, in combination, an electric battery providing a source of direct current, a direct current propulsion motor connected to the battery for propelling the conveyance, said motor having exciting poles and windings thereon connected to the battery, and control means operable as a function of the motor speed and the battery voltage for progressively decreasing the effective excitation of the field winding just sufficiently to compensate for the decrease in battery voltage with the degree of discharge of the battery to thus maintain the motor speed constant up to near complete exhaustion of the battery, said control means comprising a valve stem connected to rotate in proportion to the motor speed and a governor mechanism for shifting the valve stem axially in proportion to changes in motor speed, a bearing sleeve within which the valve stem rotates and slides, fluid inlet means and fluid outlet means in the bearing sleeve, a source of fluid under pressure for supplying fluid to the inlet means, aperture means of a given cross sectional dimension in the valve stem so positioned that the sectional area of registry with the inlet and outlet means is a function of the departure of the motor speed from a selected speed, whereby fluid will be emitted from the outlet means in small spurts the quantity of fluid emitted per spurt being thus a function of the angular velocity of the valve stem and the axial position of the valve stem, and means responsive to the total quantity of fluid thus emitted for effecting the said progressive decrease of the effective excitation of the field windings of the motor.

5. In a system of control for an electrically propelled conveyance, in combination, an electric battery providing a source of direct current, a direct current propulsion motor of the series type connected to the battery for propelling the conveyance, said motor having exciting poles and windings thereon connected to the battery, and control means operable as a function of the motor speed and the battery voltage for progressively shifting the motor brushes to produce a demagnetizing component by the motor armature current for decreasing the effective excitation of the field winding just sufficiently to compensate for the decrease in battery voltage with the degree of discharge of the battery to thus maintain the motor speed constant up to near complete exhaustion of the battery, said control means comprising a valve stem connected to rotate in proportion to the motor speed and a governor mechanism for shifting the valve stem axially in proportion to changes in motor speed, a bearing sleeve within which the valve stem rotates and slides, fluid inlet means and fluid outlet means in the bearing sleeve, a source of fluid under pressure for supplying fluid to the inlet means, aperture means of given cross sectional dimensions in the valve stem so positioned that the sectional area of registry with the inlet means and outlet means is a function of the departure of the motor speed from a selected speed, whereby fluid will be emitted from the outlet means in small spurts the quantity of fluid emitted per spurt being thus a function of the angular velocity of the valve stem and the axial position of the valve stem, and means responsive to the total quantity of fluid thus emitted for effecting the said progressive shifting of said brushes to thus effect said decrease of the effective excitation of the field windings of the motor.

6. In a system of control for an electrically propelled conveyance, in combination, an electric battery providing a source of direct current, a direct current propulsion motor connected to the battery for propelling the conveyance, said motor having exciting poles and windings thereon connected to the battery, and control means operable as a function of the motor speed and the battery voltage for progressively decreasing the effective excitation of the field winding just sufficiently to compensate for the decrease in battery voltage with the degree of discharge of the battery to thus maintain the motor speed constant up to near complete exhaustion of the battery, said control means comprising a stem connected to shift axially in proportion to changes in motor speed, a bearing for the stem, a switch operated to close by the axial shift of the stem upon changes in speed of the motor, a pilot motor energized by the closure of said switch, and means operated by said pilot motor for effecting said progressive decrease in the effective excitation of said propulsion motor.

7. In a system of control for an electrically propelled conveyance, in combination, an electric battery providing a source of direct current, a direct-current propulsion motor of the series type connected to the battery for propelling the conveyance, said motor having exciting poles and windings thereon connected to the battery, and control means operable as a function of the motor speed and the battery voltage for progressively shifting the motor brushes to produce a demagnetizing component by the motor armature current for decreasing the effective excitation of the field winding just sufficiently to compensate for the decrease in battery voltage with the degree of discharge of the battery to thus maintain the motor speed constant up to near complete exhaustion of the battery, said control means comprising a stem connected to shift axially in proportion to changes in motor speed, a bearing for the stem, a switch operated to close by the axial shift of the stem upon changes in speed of the motor, a pilot motor energized by the closure of said switch, and means operated by said pilot motor for effecting said progressive shifting of said motor brushes to thus effect said decrease in the effective excitation of said propulsion motor.

8. In a system of control for an electrically propelled torpedo, in combination, a torpedo, a battery of a given capacity in the torpedo for providing a source of direct-current energy, a direct-current torpedo propulsion motor, means for connecting the motor to the battery at the moment the torpedo is fired, said motor having exciting poles and windings thereon also connected to the battery at the moment the torpedo is fired, and control means operable as a function of the motor speed and the battery voltage for progressively decreasing the effective excitation of the field winding just sufficiently to compensate for the decrease in battery voltage with the degree of battery discharge to thus maintain the speed of the torpedo constant up to near complete discharge of the battery.

9. In a system of control for an electrically propelled torpedo, in combination, a torpedo, a battery of a given capacity in the torpedo for providing a source of direct-current energy, a direct-current torpedo propulsion motor of the series type, means for connecting the motor to the battery at the moment the torpedo is fired, said motor having exciting poles and windings thereon also connected to the battery at the moment the torpedo is fired, and control means operable as a function of the motor speed and the battery voltage for progressively shifting the motor brushes to produce a demagnetizing component by the motor armature current for decreasing the effective excitation of the field winding just sufficiently to compensate for the decrease in battery voltage with the degree of battery discharge to thus maintain the speed of the torpedo constant up to near complete discharge of the battery.

10. In a system of control for an electrically propelled torpedo, in combination, a torpedo, a battery of a given capacity in the torpedo for providing a source of direct-current energy, a direct-current torpedo propulsion motor, means for connecting the motor to the battery at the moment the torpedo is fired, said motor having exciting poles and windings thereon also connected to the battery at the moment the torpedo is fired, and control means operable as a function of the motor speed and the battery voltage for progressively decreasing the effective excitation of the field winding just sufficiently to compensate for the decrease in battery voltage with the degree of battery discharge to thus maintain the speed of the torpedo constant up to complete discharge of the battery, said control means comprising a valve stem connected to rotate in proportion to the motor speed and a governor mechanism for shifting the valve stem axially in proportion to changes in motor speed, a bearing sleeve within which the valve stem rotates and slides, fluid inlet means and fluid outlet means in the bearing sleeve, a source of fluid under pressure for supplying fluid to the inlet means, an aperture of given cross sectional dimensions in the valve stem so positioned that the sectional area of registry with the inlet and outlet means is a function of the departure of the motor speed from a selected speed, whereby fluid will be emitted from the outlet means in small spurts the quantity of fluid emitted per spurt being thus a function of the angular velocity of the valve stem and the axial position of the valve stem, and means responsive to the total quantity of fluid thus emitted for effecting the said progressive decrease of the effective excitation of the field windings of the motor.

11. In a system of control for an electrically propelled torpedo, in combination, a torpedo, a battery of a given capacity in the torpedo for providing a source of direct-current energy, a direct-current torpedo propulsion motor of the series type, means for connecting the motor to the battery at the moment the torpedo is fired, said motor having exciting poles and windings thereon also connected to the battery at the moment the torpedo is fired, and control means operable as a function of the motor speed and the battery voltage for progressively shifting the motor brushes to produce a demagnetizing component by the motor armature current for decreasing the effective excitation of the field winding just sufficiently to compensate for the decrease in battery voltage with the degree of battery discharge to thus maintain the speed of the torpedo constant up to near complete discharge of the battery, said control means comprising a valve stem connected to rotate in proportion to the motor speed and a governor mechanism for shifting the valve stem axially in proportion to changes in motor speed, a bearing sleeve within which the valve stem rotates and slides, fluid inlet means and fluid outlet means in the bearing sleeve, a source of fluid under pressure for supplying fluid to the inlet means, an aperture of given cross sectional dimensions in the valve stem so positioned that the sectional area of registry with the inlet and outlet means is a function of the departure of the motor speed from a selected speed, whereby fluid will be emitted from the outlet means in small spurts the quantity of fluid emitted per spurt being thus a function of the angular velocity of the valve stem and the axial position of the valve stem, and means responsive to the total quantity of fluid thus emitted for effecting the said progressive shifting of said brushes to thus effect said decrease of the effective excitation of the field windings of the motor.

12. In a system of control for an electrically propelled torpedo, in combination, a torpedo, a battery of a given capacity in the torpedo for providing a source of direct-current energy, a direct-current torpedo propulsion motor, means for connecting the motor to the battery at the moment the torpedo is fired, said motor having exciting poles and windings thereon also connected to the battery at the moment the torpedo is fired, and control means operable as a function of the motor speed and the battery voltage for progressively decreasing the effective excitation of the field winding just sufficiently to compensate for the decrease in battery voltage with the degree of battery discharge to thus maintain the speed of the torpedo constant up to complete discharge of the battery, said control means comprising a stem connected to shift axially in proportion to changes in motor speed, a bearing for the stem, a switch operated to close by the axial shift of the stem upon changes in speed of the motor, a pilot motor energized by the closure of said switch, and means operated by said pilot motor for effecting said progressive decrease in the effective excitation of said propulsion motor.

13. In a system of control for an electrically propelled torpedo, in combination, a torpedo, a battery of a given capacity in the torpedo for providing a source of direct-current energy, a direct-current torpedo propulsion motor of the series type, means for connecting the motor to the battery at the moment the torpedo is fired, said motor having exciting poles and windings thereon also connected to the battery at the moment the torpedo is fired, and control means operable as a function of the motor speed and the battery voltage for progressively shifting the motor brushes to produce a demagnetizing component by the motor armature current for decreasing the effective excitation of the field winding just sufficiently to compensate for the decrease in battery voltage with the degree of battery discharge to thus maintain the speed of the torpedo constant up to near complete discharge of the battery, said control means comprising a stem connected to shift axially in proportion to changes in motor speed, a bearing for the stem, a switch operated to close by the axial shift of the stem upon changes in speed of the motor, a pilot motor energized by the closure of said switch, and means operated by said pilot motor for effecting said progressive shifting of said motor brushes to thus effect said decrease in the effective excitation of said propulsion motor.

WALTER H. SMITH.